Dec. 2, 1941.    H. W. PLEISTER    2,264,404
ARTICLE OF MANUFACTURE
Original Filed June 22, 1940    3 Sheets-Sheet 1
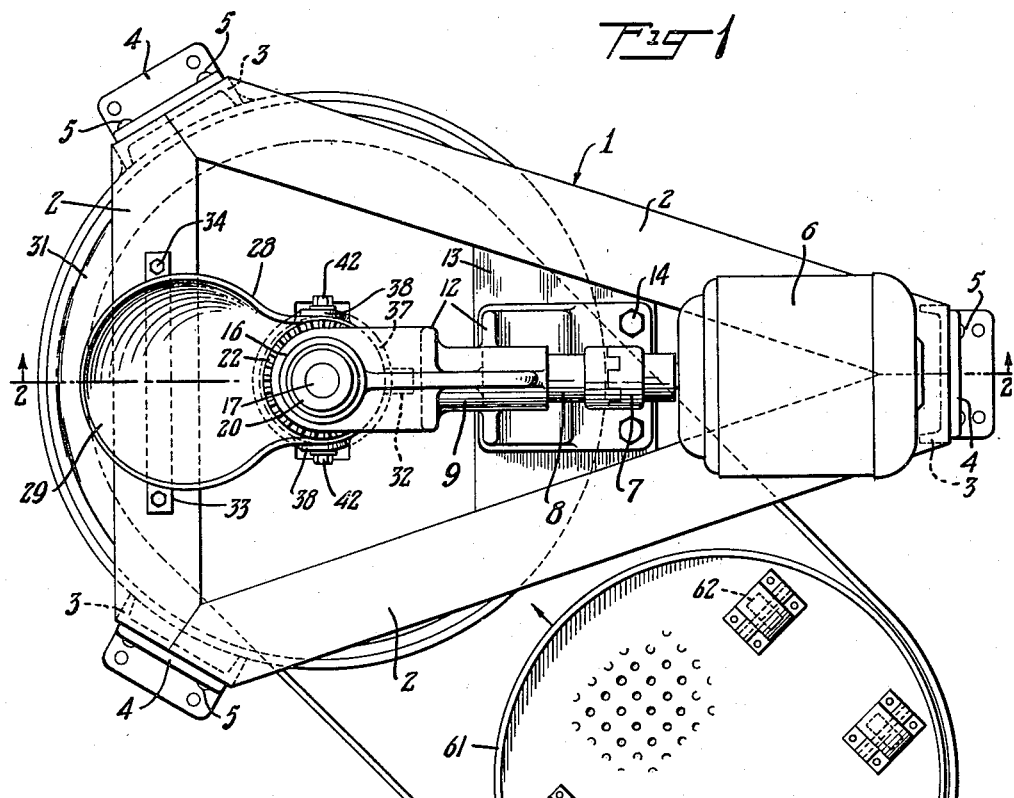
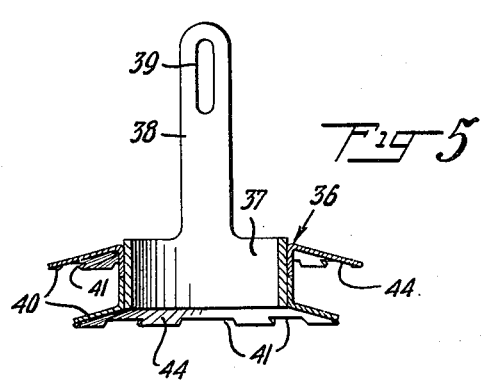

Dec. 2, 1941. H. W. PLEISTER 2,264,404
ARTICLE OF MANUFACTURE
Original Filed June 22, 1940  3 Sheets-Sheet 2
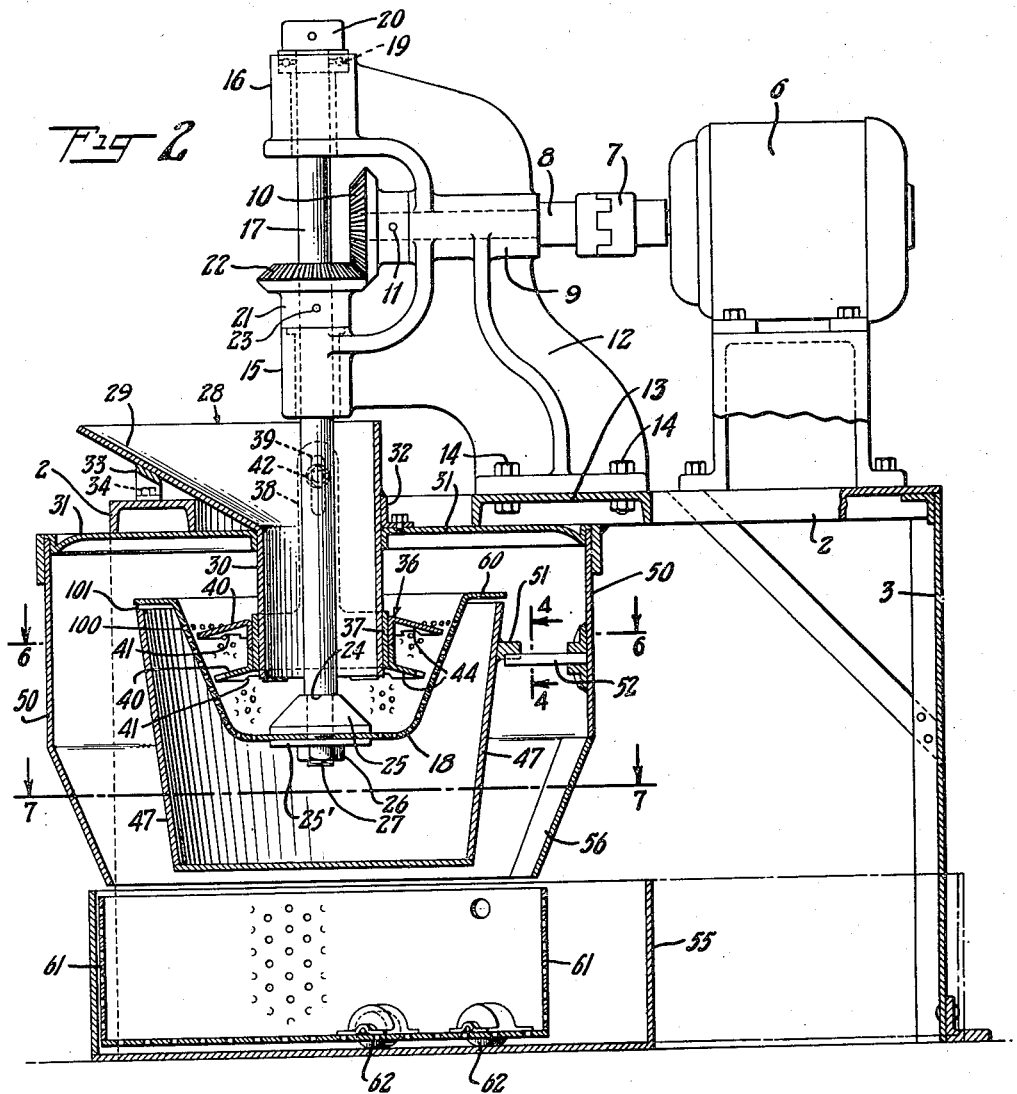
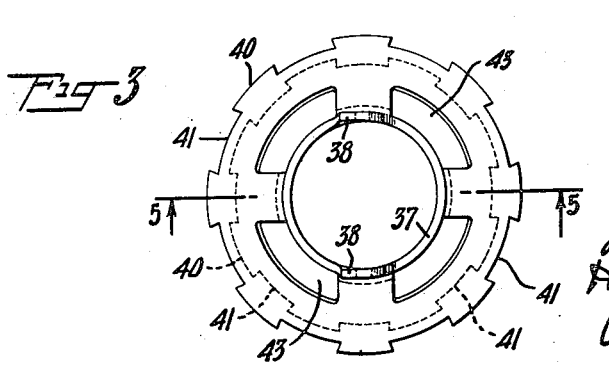
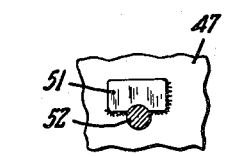

Dec. 2, 1941.   H. W. PLEISTER   2,264,404
ARTICLE OF MANUFACTURE
Original Filed June 22, 1940   3 Sheets-Sheet 3
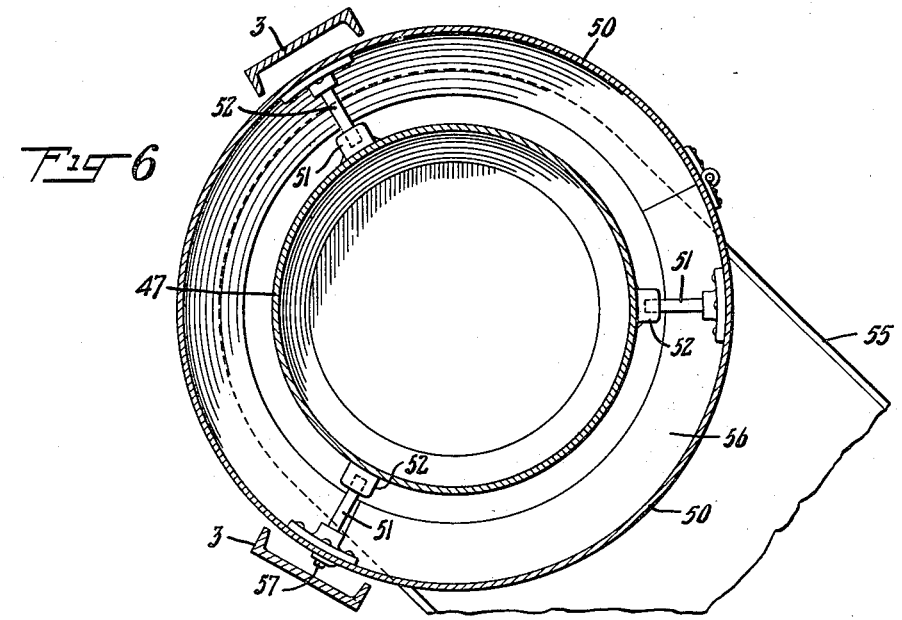
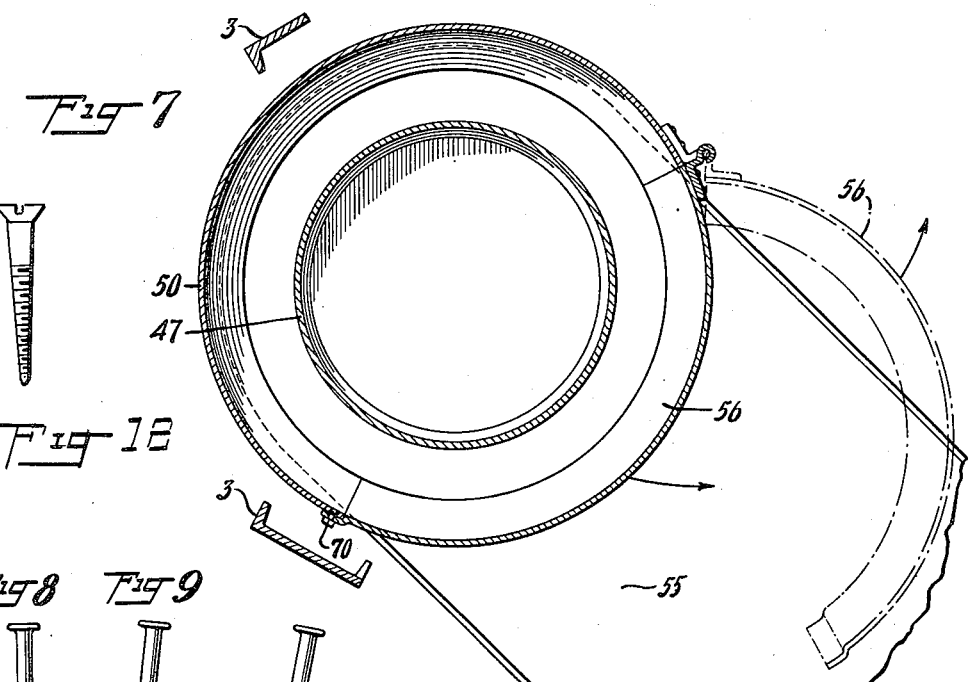
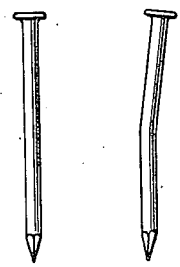

Patented Dec. 2, 1941

2,264,404

UNITED STATES PATENT OFFICE 2,264,404

ARTICLE OF MANUFACTURE

Henry W. Pleister, Westfield, N. J., assignor to Diamond Expansion Bolt Company, Inc., Garwood, N. J., a corporation of New Jersey Original application June 22, 1940, Serial No. 341,908. Divided and this application January 24, 1941, Serial No. 375,754

4 Claims. (Cl. 85—10)

This application is a divisional application of my parent application, Serial No. 341,908, filed June 22, 1940, for Method and apparatus for coating materials and article. In conformity with the Patent Office requirement for division in that case, this divisional application is filed to cover the article of manufacture, preferably made by my method and apparatus, described and claimed in my said original or parent application.

To clearly describe the article of manufacture, its uses, marked advantages, and characteristics, it is necessary to describe how it is distinguished from other articles of manufacture.

My invention covers a metal article of manufacture, of regular, or more or less irregular contour, having a thin, smooth, and ductile coating of a different metal, usually zinc, aluminum, tin, alloy, or any suitable metal that will melt at a lower temperature than the metal article. For example, the uncoated metal articles might be a driven, headed and screw threaded fastenings including nails, spikes, tacks, screws, bolts, staples, glazier points, nuts, rivets, washers, or similar articles.

The thin, smooth, ductile coating is applied commercially to such articles as above mentioned, or similar ones, by galvanizing by the hot process in which zinc or spelter is used.

That my invention may be more readily understood by those skilled in the art, I shall now describe the process and the apparatus which I preferably employ, and which is the subject of the parent application from which this divisional application has been carved.

In my process the separate articles of regular or irregular contour, to be coated, are immersed in a bath of molten zinc or spelter, or in a bath of any other molten metal if that metal is desired to coat the articles.

The metal objects are then removed from the molten bath and immediately subjected, in a basket or other container, to centrifugal action to remove the surplus coating material, the centrifugal action automatically throwing the separate articles over the rim of the whirling basarate or other container, allowing them to drop unto a cooling bath of water or other fluid.

Further by my process the travel of the separate independent articles out of the basket is temporarily impeded, to insure that all the different coated articles shall have all the surplus coating metal removed before they are automatically thrown over the lip of the basket or other container. To further this action and to insure the complete and uniform covering of the articles so there will be no blisters, rough spots, blow-holes, or excess material at any point on the articles; that the coating material will be smooth and ductile, and that there will be no adhesion between any two or more articles, I subject the coated articles while in the basket and while under centrifugal action, and while substantially at their maximum temperature, to percussion blows, which not only separate any two or more coated articles, which might have adhered to each other, but the percussion blows assist in removing any surplus coating metal from the articles.

These successive percussion blows on the articles while in the whirling basket also insure a smooth, even, and ductile coating. These blows are given the coated articles as they seek, under the centrifugal action, to automatically work over the rim or lip of the basket or other container.

These percussion blows may be given in various ways to the articles while in the centrifugal basket. I have obtained perfect results by letting the centrifugal action throw the treated articles against non-rotating baffle plates mounted in the rotating basket or container. Their action will be more fully hereinafter described.

My method of removing all the surplus coating material from the articles while they are substantially at their maximum temperature and under the action of centrifugal force is continuous.

The coated articles may be fed into my machine in any suitable manner as may be found convenient, there being no stopping or starting of the machine for the treatment of each basketful of articles processed, thereby insuring a great saving of time with less wear on the machine and motor, and less labor required per ton of articles treated.

My invention further relates to any coated article manufactured which comes under the terms of my claims.

In the accompanying drawings I have shown one article of manufacture and one illustrative form of method and apparatus which may be employed. It is to be understood, however, that my invention is not to be limited to this particular article of manufacture, illustrated by way of example.

Fig. 1 is a plan view of one form of apparatus for carrying out my improved method for manufacturing the article of manufacture.

Fig. 2 is a vertical section on line 2, 2 of Fig. 1;

Fig. 3 is a plan view of one form of adjustable baffle spider;

Fig. 4 is a cross-section on line 4—4 of Fig. 2;

Fig. 5 is a vertical section on line 5, 5 of Fig. 3;

Fig. 6 is a cross-section on line 6, 6 of Fig. 2;

Fig. 7 is a cross-section on line 7, 7 of Fig. 2;

Fig. 8 is a side elevation of a wire nail, being one of the great number of separate articles which are coated by my method, which is illustrated simply by way of example;

Fig. 9 is a side elevation of the same nail bent seven degrees;

Fig. 10 is a side elevation of the same nail bent twelve degrees;

Fig. 11 is a side elevation of the same nail bent one hundred and eighty degrees.

Fig. 12 is a side elevation of a screw being one of the great number of separate articles which are coated by my method, and which is illustrated simply by way of example.

In the machine, illustrated by way of example, the triangular frame 1 consists of three horizontal plates 2, 2 secured to the vertical legs 3, 3 preferably formed of channel irons, secured to the brackets 4, 4 in any suitable manner such as by the rivets 5.

On the frame 1 is mounted a motor 6, provided with a flexible coupling 7 to drive the shaft 8 mounted in the horizontal bearing 9. On the other end of this shaft 8 is mounted a bevel gear 10, secured to the shaft in any suitable manner as by the pin 11.

This horizontal bearing 9 is formed in the bracket 12, secured to the plate 13 by any suitable means as by the bolt 14. This bracket 12 has also two vertical bearings 15 and 16, in which is mounted the drive shaft 17 to rotate the perforated basket 18. The upper portion of the drive shaft 17 is provided with a head or enlargement 20, supported on the bracket 12 by a roller bearing 19. On the shaft 17 is mounted a sleeve 21 carrying a bevel gear 22 in mesh with the bevel gear 10. The sleeve 21 is secured to the shaft 17 in any suitable manner as by a pin 23.

On the lower end of the drive shaft 17 is carried the perforated basket 18, preferably by reducing the diameter of the shaft slightly to form a shoulder 24, so that a cone shaped collar 25 mounted upon the reduced portion of the shaft 17, will permit the nut 26 to clamp and hold the bottom of the basket 18 as the nut is screwed up on the thread 27 on the end of the shaft 17. The washer 25' may be located between the nut 26 and the bottom of the bracket 18, Fig. 2. This cone-shaped collar 25 also spreads the articles to be coated towards the sides of the basket 18, and prevents a "dead" spot in the basket, where the full force of the centrifugal action would not be exerted upon the articles when fed into the basket through the funnel 28.

This funnel 28 has a lip 29 and a cylindrical portion 30, which extends well down into the basket 18, see Fig. 2. The funnel 28 is immovably secured to the cover 31 by the bracket 32 and the bracket 33, the ends of this latter bracket being secured by the bolts 34, 34 to the channel iron 2, see Figs. 2 and 1.

On the cylindrical portion 30 of the funnel 28, I mount my baffle or spider unit 36, Figs. 5, 2 and 3, which is preferably adjustable vertically, but when once adjusted is immovable.

This baffle unit or spider 36 consists of a cylindrical sleeve 37 (Figs. 3 and 5), provided with two arms 38, 38, each arm being provided with an elongated adjusting slot 39. Mounted fast on the cylindrical sleeve 37 are one or more baffle plates 40, 40, two being shown by way of example. These baffle plates 40, 40 are provided with openings 41, 41, preferably in the form of cut-away portions in the baffle plates, though of course they could be formed in any other suitable manner. Openings 43, 43, Fig. 3, between the baffle plates 40, 40 and the sleeve 37 are also preferably provided.

I preferably arrange the outer rim of each baffle plate 40 at a lower elevation than the center of the baffle plate so as to form an inclined surface 44, Fig. 5.

The openings 41, 41 and 43, 43, in each baffle plate 40 are preferably arranged staggered with relation to the similar openings in the next higher baffle plate, to prevent too rapid exit of the coated articles from the basket 18, and to insure that each coated article, at one or more points in its travel out of the perforated basket, will receive a tap or percussion blow by being thrown against one or more of the fixed baffle plates 40.

After adjusting the baffle or spider unit 36 at the desired position on the cylindrical portion of the fixed funnel 30, it is held in that adjusted position by means of the nuts 42, 42 (Figs. 1 and 2).

Removably mounted on the interior of the outer fixed shield or guard 50 is a spelter guard 47. Any suitable form of mounting which will permit the removal of the spelter guard to remove the excess spelter, or other coating material, thrown off of the coated articles and caught by the spelter guard 47, may be employed. I have shown the exterior of the spelter guard provided with three lugs 51, 51, Figs. 6 and 4, cooperating with the pins 52, 52 immovably secured to the outer fixed shield or guard 50.

When it is necessary to clean out this spelter guard 47, to remove the excess spelter, or other coating material caught by it during the centrifugal action, it can be turned slightly to free the lugs 51, 51, from the fixed pins 52, 52, Fig. 4, permitting it to drop into the oval water tank 55, when it can be taken out and cleaned before replacing it on the lugs 51, 51. To assist in this operation, the fixed shield or guard 50 is provided with a door 56, Figs. 2, 6 and 7. The door may be held closed by any suitable means, such as by the bolt 70, Fig. 7.

Applicant is the patentee of U. S. Patent 1,662,537, granted March 13, 1928.

To fully understand the invention covered by this present application, it is necessary to comply with sec. 4888 of the Revised Statutes, and to refer to the prior art, which is exemplified by this prior patent.

In the prior art, using a flaring basket, and relying on the centrifugal action to throw the coated articles out over the lip or edge of the basket, after the surplus coated material had been removed, or partially removed, it is found impossible to control the time that the articles are subjected to centrifugal action.

For example, it is found in practice that where a sufficient flare or incline is given to the sides of the basket to insure the coated articles, under the centrifugal action, rising from the bottom of the basket, they will be thrown over the lip or upper edge of the basket and into the cooling water before they have been sufficiently stripped of their excess coating material. Moreover, a large portion of the free molten coating material will also be thrown over the lip of the basket with the coated articles.

If, on the other hand, the sides of the perforated basket are not inclined or flared sufficiently, the coated articles will remain in the basket and defeat the purpose not only of having the centrifugal action remove the excess coating material from the coated articles, but also automatically throw out of the basket such coated articles as have been properly processed to make room in the basket for new untreated coated articles.

Experience has shown that there is no middle ground where the coated articles will slowly move up the sides of the basket, to allow sufficient time for the necessary centrifugal treatment. The coated articles will either stay in the bottom of the basket when its sides have not a sufficient flare or incline, or will fly with great rapidity over the lip of the basket, where there is enough flare or incline to move them upward at all.

It is also found that under the old method different sizes and shapes of articles require different inclines or flares to the sides of the basket, in order to cause them to rise under the centrifugal action. When once a sufficient incline is given to the sides of the basket for them to rise at all, they will immediately fly out of the basket without having received the amount of centrifugal treatment to insure a smooth and ductile surface.

Furthermore, during the centrifugal operation where articles are discharged suddenly from the bottom over the top of the basket, a large portion of the molten excess coating will carry out over the top of the basket and move along with the coated articles and, at the same time, adhere to many of them, causing blisters, rough spots, and irregularities in the thickness of the coating.

*Method of operation*

In my present invention the separate detached articles to be coated are first immersed in the molten metal bath of the coating material, which may be zinc, aluminum, tin, spelter, alloy, or any other suitable coating material. For convenience in description I shall refer to the molten bath as being one of spelter.

While the articles coated may be any separate and detached articles I shall, for convenience, refer to them as wire nails, as illustrated in Figs. 8 to 10, though, of course my invention is not to be confined to such articles.

The coated articles are fed on to the lip 29 of the fixed funnel 28 by any suitable means, in batches or continuously, and drop on to the cone-collar 25, which distributes them around the bottom of the perforated basket 18. As the basket is being rotated continuously, they are immediately subjected to centrifugal action, and move up the flaring or inclined sides of the basket 18.

Some of the excess coating material will be immediately thrown off and pass out through the perforations in the basket, and fall into the spelter catch or guard 47. Meanwhile, the articles continue to move up, the flaring or inclined sides of the basket 18 in their attempt to work their way immediately over the lip 60 of the basket, so that they could hit the inside surface of the fixed shield or guard 50, and then fall into the container 61, mounted on wheels 62, 62, in the water trough 55. This container 61 can be wheeled out from under the centrifugal basket 18, Fig. 1, to remove the processed articles without stopping the machine.

However, in my invention, the coated articles do not move freely out of the centrifugal machine. Their free movement is retarded by one or more baffle plates 40, 40 while still in the centrifugal basket 18, and while still at substantially their maximum temperature, and before the coating material can set.

By adjusting the edges of the baffle plates 40, 40 to or from the flaring or inclined surface of the centrifugal basket 18, the progress of the coated articles upward towards the lip 60 of the centrifugal basket is impeded and a certain percentage of the articles will be retarded and forced back into the bottom of the basket 18 to rise again, thereby retaining the coated articles that much longer under the centrifugal action of the basket 18.

Some of the coated articles will pass through some of the openings 41, 41 and 43, 43 in the different baffle plates 40, 40, by arranging, if necessary, these openings in each baffle plate staggered with relation to those in the next adjacent baffle plate; thereby the coated articles are further retained a sufficient length of time in the centrifugal basket 18 to insure that all the surplus coating material is removed from all the coated articles, and that the completely processed coated articles are smooth, without blemish, and have a ductile coating.

This ductile coating is very important. Not only are articles made by my method or process superior to those made by the prior art, but they are safer, in that the coating metal on articles processed by my method has greater ductility and adherence to the metal of the article coated.

Three have been instances where mechanics on several occasions have been blinded by flying spelter in driving nails or spikes where the zinc or spelter has flaked off and flown into the eye of the mechanic.

Tests on nails, spikes, bolts, screws, wire staples and numerous other articles coated by old methods indicate that a bend of 7 to 12 degrees is approximately the limit before the coating metal will crack and flake, Figs. 9 and 10. With my improved method, it is possible to coat small articles in a mass that will stand a bend of 180°, Fig. 11, or more, without flaking the zinc coating.

In practical operation two or more centrifugal baskets 18, having different flaring or inclined sides are employed, depending upon the size of the articles to be processed.

The basket 18 illustrated with a flare or inclined surface, as shown, will work perfectly with articles of substantially the same size. It will work equally as well with larger or smaller articles to be processed, by adjusting the baffle or spider unit 36, on the cylindrical portion 30 of the fixed funnel, to or from the bottom of the basket 18, by loosening the nuts 42, 42, and sliding the arms 38, 38 of the baffle or spider unit 36, up or down, as permitted by the adjusting slots 39, 39.

By using one basket 18, having a given flare or inclined sides, and adjusting the baffle or skeleton units as described, different sized articles within a wide range may be processed with the same centrifugal basket 18.

One or more other centrifugal baskets, having different inclined or flared sides, may be used for articles of different sizes. So also different sized baffle or spider units 36 may be used with different centrifugal baskets 18.

It will be noted that in my invention the coated articles, while in the centrifugal basket 18, and while the coating metal is substantially at its maximum temperature, and has had no opportunity to set or freeze, are subjected to multiple percussion blows, by being thrown against the fixed baffles 40, 40.

These percussion blows are given the coated articles while in the basket 18, and remove a large quantity of the surplus coating metal, and tend to spread out evenly the remaining coating metal, so that the coated articles are given a smooth and ductile coating. The advantage of having a ductile coating has been previously described.

The lip 60 of the basket 18 overhangs the sides of the spelter guard 47, so that no spelter, or other coating metal or any coated article, can drop from the lip 60 into the spelter guard 47. I also preferably discontinue the perforations in the centrifugal basket 18 at an appreciable distance from the lip 60, the last perforations being on a line marked 100, so that no excess spelter will be thrown out in the space 101 between the lip 60 and the spelter guard 47, to fall into the container 61.

The words "zinc or spelter" are used herein as synonymous; spelter is a trade name for commercial zinc, which may, or may not, contain more or less impurities.

It is also to be understood that the words "zinc or spelter" are given simply by way of example. Any other suitable coating metal or alloy having the same characteristics may be employed.

Applicant does not claim that he is the inventor of coating wire, by passing it continuously through a molten bath and stripping it, more or less, of its excess coating metal by rollers, dies, or air under pressure. Nor does he claim such wire so coated. Nor does he claim to be the inventor of coated flat sheets, commonly called tin plate. Nor does he claim to be the inventor of coating tacks or nails by such a crude and unsuccessful process as that described in the U. S. Patent #135,339, January 28, 1873.

He has, however, made a revolutionary invention in producing and placing on the market small hardware articles, such as driven, headed and screw threaded fastenings including nails, screws, nuts, bolts, washers, tacks, spikes, wire staples, wire nails, or other similar articles, by giving them a single coating of metal which is thin, ductile, smooth, devoid of blisters, rough spots, or irregularities in thickness, and which is non-flaking under bending, rotary, or percussion strains.

Having thus described my new article of manufacture in connection with illustrative embodiments thereof, I do not desire to limit my invention except as may be necessary by the terms of my claims.

What I claim is:

1. A new article of manufacture comprising a driven or headed fastener formed of hard metal and provided with a single metal coating by immersion in a hot metal liquid bath of the coating metal, said coating being thin, ductile, smooth, devoid of blisters, rough spots, or irregularities in thickness, and is non-flaking under bending or percussion strains.

2. A new article of manufacture comprising a screw threaded fastener, provided with a single metal coating by immersion in a hot metal liquid bath of the coating metal, said coating being thin, ductile, smooth, devoid of blisters, rough spots or irregularities in thickness, and is non-flaking under bending or rotatable strains.

3. A new article of manufacture comprising a driven or headed fastener, formed of hard metal and provided with a single coating of zinc, by immersion in a hot bath of liquid zinc, said coating of zinc being thin, ductile, smooth, devoid of blisters, rough spots or irregularities in thickness, and is non-flaking under bending or percussion strains.

4. A new article of manufacture comprising a screw threaded fastener, formed of hard metal and provided with a single coating of zinc by immersion in a hot bath of liquid zinc, said coating of zinc being thin, ductile, smooth, devoid of blisters, rough spots, or irregularities in thickness, and is non-flaking under bending, percussion or rotatable strains.

HENRY W. PLEISTER.